United States Patent [19]

Sperry et al.

[11] Patent Number: 5,319,055
[45] Date of Patent: Jun. 7, 1994

[54] NON-AQUEOUS THICKENING AGENTS

[75] Inventors: Peter R. Sperry, Doylestown; Chao-jen Chung, North Wales, both of Pa.

[73] Assignee: Rohm and Haas Company, Philadelphia, Pa.

[21] Appl. No.: 780,674

[22] Filed: Oct. 18, 1991

[51] Int. Cl.$^5$ ............................................. C08G 18/08
[52] U.S. Cl. ...................................... 528/49; 528/75; 524/426; 524/427; 524/457; 524/459
[58] Field of Search ............... 524/425, 427, 457, 459; 528/49, 75

[56] References Cited

U.S. PATENT DOCUMENTS

| | | | |
|---|---|---|---|
| 4,107,256 | 8/1978 | Conrad et al. | 528/48 |
| 4,191,802 | 3/1980 | Guise et al. | 428/375 |
| 4,337,184 | 6/1982 | Schimmel et al. | 524/726 |
| 4,520,158 | 5/1985 | Peiffer et al. | 524/481 |
| 4,668,131 | 5/1987 | Lochhead, et al. | 524/474 |
| 4,778,843 | 10/1988 | Cooperman et al. | 524/666 |
| 4,866,120 | 9/1989 | Rudnick et al. | 524/869 |

Primary Examiner—John Kight, III
Assistant Examiner—D.V.C. Truong
Attorney, Agent, or Firm—Ronald D. Bakule

[57] ABSTRACT

Novel thickening agents, useful for thickening non-aqueous solvent-containing compositions, are provided. The thickening agents are the reaction product of a polyol containing at least two hydroxyl groups; a polyisocyanate containing at least two isocyanato groups; and an active hydrogen compound. A method of thickening non-aqueous systems by admixing with the novel thickening agents is also provided.

12 Claims, No Drawings

NON-AQUEOUS THICKENING AGENTS

FIELD OF THE INVENTION

This invention relates to novel thickening agents, a process for making the novel compositions, and a method for thickening non-aqueous systems by admixing with the novel thickeners.

BACKGROUND OF THE INVENTION

Non-aqueous solvents, non-aqueous polymer solutions such as, for example, a solution of an alkyd in mineral spirits, dispersions of polymers in non-aqueous media (called non-aqueous dispersions or NADs), and non-aqueous paints, paint strippers, adhesives, inks, sealants, mastics, caulks, pigment dispersions, and pigment printing pastes frequently are advantageously bodied, viscosified, or thickened. Not only is the efficiency of a thickening agent of direct concern but also other properties of the system which are affected by the thickening agent such as, for example, storage stability, anti-settling properties of pigmented systems, rheology, brush or roller transfer and application of coatings systems or adhesives, and levelling and sagging of applied films. Bentone clay, silica, metallic soaps, polyolefin-based organics, and hydrogenated castor oil are used in solvent-borne systems but their efficiency, ease of handling and formulation, and balance of properties are not adequate for all non-aqueous solvent-borne systems. The novel thickening agents of this invention fill the need for an efficient thickener with a desirable property balance for non-aqueous solvent-borne systems.

DESCRIPTION OF THE PRIOR ART

U.S. Pat. No. 4,337,184 discloses a rheology modifier derived from the reaction of 8 moles of a polyalkylene oxide such as, for example, polybutylene oxide diol, from about 0.1 to about 3 moles of a polyfunctional material such as, for example, a polyol having a hydroxyl functionality of at least 3, from about 4 to about 15 moles of a diisocyanate such as, for example, 1,10-decamethylene diisocyanate, less than about 3 moles water and additional diisocyanate to compensate for any water present. The rheology modifiers are disclosed to be useful in organic solvent-based compositions and, especially, in coating compositions.

U.S. Pat. No. 4,520,158 discloses a process for the viscosification of an organic liquid which comprises the step of forming a solution of a water-insoluble polyampholyte dissolved in a nonpolar hydrocarbon organic liquid. The polyampholytes disclosed are terpolymers of a nonionic monomer, a sulfonate-containing monomer, and an amine-containing monomer.

U.S. Pat. No. 4,668,731 discloses a stable or readily dispersible dispersion or slurry of a carboxylic acid polymer, such as, for example, polyacrylic acid, in mineral spirits containing a sufficient amount of an elastomer of at least one olefin or a diene, such as, for example, polybutadiene, the elastomer being swellable or dissolvable in mineral spirits. Use of this mixture in pigment pastes and construction adhesives is disclosed.

U.S. Pat. No. 4,778,843 discloses a polyamide rheological additive especially for organic solvent-based compositions which comprises the reaction product of (a) polycarboxylic acid having at least 5 carbon atoms percarboxylic acid group; (b) active hydrogen compound having the formula $X_mRY_n$ wherein R represents a group containing from 2–12 carbon atoms, X and Y are independently selected from primary amino, secondary amino, and hydroxyl, and m and n are at least 1 and the sum of (m+n) is at least 2, with the proviso that at least 90% of the X and Y groups participating in the reaction are primary amino, secondary amino, or a mixture thereof; and (c) capping agent comprised of monocarboxylic acid which is at least one of unsaturated and hydroxylated, said capping agent being present in an amount sufficient to cap the reaction product of the polycarboxylic acid and the active hydrogen compound. Also disclosed is the use of the polyamide rheological additive for thickening aliphatic and aromatic solvent-based compositions including architectural coatings, industrial paints, and certain sealants.

None of the references disclose the novel thickening agents of this invention or a process for making or using the novel thickening agents.

It is an object of this invention to provide novel thickening agents effective for thickening non-aqueous systems.

It is another object of this invention to provide novel thickening agents for use in non-aqueous systems which are effective, easy to use, and efficient.

It is a further object of this invention to provide a process for making and using novel thickening agents suitable for thickening non-aqueous systems.

SUMMARY OF THE INVENTION

Novel thickening agents, useful for thickening non-aqueous solvent-containing compositions, are provided. The thickening agents are the reaction product of (a) a polyol containing at least two hydroxy groups, (b) a polyisocyanate containing at least two isocyanato groups and (c) an active hydrogen compound having the formula R—X, wherein X is selected from the group consisting of primary amino, secondary amino, and hydroxyl, and wherein R represents a group containing from 1 to about 30 carbon atoms, and wherein the ratio of the number of isocyanato groups (—N=C=O) to the number of hydroxy groups (—OH) in the polyol is between about 1.05 and 2.1.

A method of thickening non-aqueous systems such as, for example, non-aqueous solvents, non-aqueous solvent-borne polymer solutions, and non-aqueous solvent-borne dispersions, by admixing with the novel thickening agents, is also provided.

DETAILED DESCRIPTION OF THE INVENTION

This invention is directed to thickening agents made by forming a reaction product from a mixture containing (a) at least one polyol containing at least two hydroxy groups, (b) at least one polyisocyanate containing at least two isocyanato groups and (c) at least one active hydrogen compound having the formula R—X, wherein X is selected from the group consisting of primary amino, secondary amino, and hydroxyl, and wherein R represents a group comprising from 1 to about 30 carbon atoms, and wherein the ratio of the number of isocyanato groups (—N=C=O) to the number of hydroxy groups (—OH) in the polyol is between about 1.05 and 2.1.

The polyol contains at least two hydroxy groups, which hydroxy groups are available for reaction with an isocyanate. The polyol may be an addition-polymerized or condensation-polymerized polyol such as, for example, an acrylic polyol, a polyester polyol, a polyether polyol, a polycaprolactone polyol, and a polyolefin polyol. A polybutadiene polyol is preferred. It is also preferred that the polyol is a substantially linear molecule bearing two terminal primary hydroxy groups. The most preferred polyol is an a,w-dihydroxypolybutadiene. The polyol may have a number average molecular weight of from about 1500 to about 10,000. A number average molecular weight of about 3000 is preferred.

The polyisocyanate may be a di-or tri-isocyanate; it is preferably a diisocyanate having the structure O=C=N—R$_1$—N=C=O wherein R$_1$ is an alkylene, cycloakylene or arylene, either unsubstituted or substituted with groups such as halo, alkyl or aryl. Preferred is dimer acid diisocyanate which is an aliphatic diisocyanate based on a long chain, dimerized fatty acid backbone containing about 36 carbon atoms.

The ratio of the number of isocyanato groups (—NCO) in the polyisocyanate to the number of hydroxy groups (—OH) in the polyol is between about 1.05 to about 2.1. Preferably, the ratio of the number of isocyanato groups to the number of hydroxy groups in the polyol is between about 1.1 to about 1.8.

The active hydrogen compound has the formula R—X, where X is selected from the group consisting of primary amino, secondary amino, and hydroxyl, and where R represents a group comprising from 1 to about 30 carbon atoms. R may be an alkylene, cycloakylene or arylene, either unsubstituted or substituted with groups such as halo, alkyl, aryl, alkoxy, t-alkylamino, and the like. Preferred are t-alkylaminoalkyl amines or t-alkylaminoalkyl alcohols. The most preferred active hydrogen compound is $(CH_3)_2N(CH_2)_3NH_2$.

The reaction of the polyisocyanate, the polyol and the active hydrogen compound takes place readily at ambient temperatures in solution in any solvent for all of the reactants. It is preferred that the solvent not contain groups reactive with isocyanato or hydroxyl groups under the reaction conditions employed. Toluene is most preferred.

A process of forming a reaction product from a mixture containing at least one polyol, the polyol containing at least two hydroxy groups; at least one polyisocyanate, the polyisocyanate containing at least two isocyanato groups; and at least one active hydrogen compound having the formula R—X; may be used, wherein X is selected from the group consisting of primary amino, secondary amino, and hydroxyl, and wherein R represents a group comprising from 1 to about 30 carbon atoms; and wherein the ratio of the number of isocyanato groups to the number of hydroxy groups in the polyol is from about 1.05 to about 2.1; and wherein the ratio of the sum of the number of active hydrogen groups and the number of hydroxy groups in the polyol to the number of isocyanato groups is less than about 1.5.

Preferred is using a process which includes (a) forming a reaction product from a mixture containing at least one polyol which polyol contains at least two hydroxy groups and at least one polyisocyanate which polyisocyanate contains at least two isocyanato groups, wherein the ratio of the number of isocyanato groups (—NCO) to the number of hydroxy groups (—OH) in the polyol is between about 1.05 to about 2.1; and (b) contacting the reaction product with at least one active hydrogen compound having the formula R—X, wherein X is selected from the group consisting of primary amino, secondary amino, and hydroxyl, and wherein R represents a group comprising from 1 to about 30 carbon atoms. Further preferred is using an amount of active hydrogen compound at least sufficient to react with all of the excess isocyanato groups.

The method of this invention for thickening a non-aqueous solvent-containing composition involves admixing the thickening agent of this invention and a non-aqueous system. The non-aqueous system may be a solvent, a solution, or a dispersion of a particulate material such as, for example, a dispersion of polymer particles or pigment particles in a non-aqueous solvent. Mixing is easily accomplished without tendency to form lumps or grit which tendency would necessitate a high shear mixer.

The non-aqueous solvent system may contain, in addition, other components such as, for example, emulsifiers, pigments, fillers, dispersants, anti-migration aids, curing agents, coalescents, wetting agents, biocides, plasticizers, anti-foaming agents, colorants, waxes, or anti-oxidants.

The following examples are intended to illustrate the thickening agents of this invention, the process for making them, and the uses thereof. They are not intended to limit the invention as other applications of the invention will be obvious to those of ordinary skill in the art.

EXAMPLE 1

Preparation of Thickening Agent

To a mechanically-stirred 4-necked round bottom flask fitted with a Dean-Stark trap, thermometer, and reflux condenser was added 201.8 g. hydroxy-terminated polybutadiene (Arco Chemical Co. Poly-BD R-45M resin; 0.73 milliequivalents OH/g.) and 684 g. toluene. The Dean-Stark trap was pre-filled with toluene so that solids content would remain constant. The solution was heated to reflux and water was azeotropically removed for 1.5 hours. The flask was cooled to 27 C. and 64 g. Dimer acid diisocyanate (DDI) (an aliphatic diisocyanate based on a long chain, dimerized fatty acid backbone containing about 36 carbon atoms; "ddi 1410" (3.22 milliequivalents —NCO/gram) from Henkel Corporation, Resins Division, Minneapolis, Minn. was used) and 0.226 g. dibutyltin dilaurate (Thermolite-12 from M & T Chemicals, Inc. was used) were added. The solution was heated to 75 C. for 2.5 hours. An additional 0.53 g. Thermolite-12 was then added, and the solution was heated for an additional 6 hours. In a 4-ounce glass jar 60.0 g. of the reaction mixture so prepared and 0.238 g. methanol (which had been dried over an activated molecular sieve) (active hydrogen compound; 7.45 milliequivalents) were heated in a 60 C. oven for 15 hours. Molecular weights determined by gel permeation chromatography using a polyester calibration were weight average molecular weight $(M_w)=87,000$ and number average molecular weight $(M_n)=18,700$.

EXAMPLES 2-11

Preparation of Additional Thickening Agents

Additional thickening agents, Examples 2-11, were prepared according to the method of Example 1 using various active hydrogen compounds (the amount of each active hydrogen compound was 7.45 milliequivalents, i.e., the same number of milliequivalents as the 0.238 g. methanol which was used in Example 1) with the results presented in Table 2.1.

TABLE 2.1

| | Preparation of additional thickening agents | | | |
|---|---|---|---|---|
| Example | Active H Cpd. | Poly-BD | $M_w$ | $M_n$ |
| 2 | $CH_3(CH_2)_3OH$ | R-45M | 92,100 | 19,400 |
| 3 | $CH_3(CH_2)_{11}OH$ | " | 93,200 | 19,100 |
| 4 | $CH_3(CH_2)_{17}OH$ | " | 92,800 | 18,100 |
| 5 | $CH_3NHCH_2CH_2OH$ | " | 68,100 | 15,700 |
| 6 | $(CH_3)_2N(CH_2)_3NH_2$ | " | 23,100 | 6,400 |
| 7 | $CH_3(CH_2)_3NH_2$ | " | 81,300 | 16,300 |
| 8 | $CH_3(CH_2)_{11}NH_2$ | " | 84,100 | 17,300 |
| 9 | $C_6H_5CH_2OH$ | " | 99,600 | 19,300 |
| 10 | Butyl CARBITOL | " | 104,000 | 19,900 |
| 11 | CARBOWAX 550 | " | 52,000 | 17,000 |

EXAMPLES 12–17

Preparation of Additional Thickening Agents

Additional thickening agents, Examples 12–17, were prepared using various active hydrogen compounds with the results presented in Table 12.1.

To a mechanically-stirred 4-necked round bottom flask fitted with a Dean-Stark trap, thermometer, and reflux condenser was added 113.9 g. hydroxy-terminated polybutadiene (Arco Chemical Co. Poly-BD R-45M resin; 0.73 milliequivalents OH/g. of resin) and 350 g. toluene. The Dean-Stark trap was pre-filled with toluene so that solids content would remain constant. The solution was heated to reflux and water was azeotropically removed for 1 hour. The flask was cooled to 60 C. and 36.1 g. Dimer acid diisocyanate (DDI) (an aliphatic diisocyanate based on a long chain, dimerized fatty acid backbone containing about 36 carbon atoms; "ddi 1410" from Henkel Corporation, Resins Division, Minneapolis, Minn. was used) in 23.6 g. toluene and 0.45 g. dibutyltin dilaurate (Thermolite-12 from M & T Chemicals, Inc. was used) were added. The solution was heated to 85 C. for 6 hours. In a 4-ounce glass jar 75.0 g. of the reaction mixture so prepared and 9.9 milliequivalents of active hydrogen compound (which had been dried over an activated molecular sieve) were heated in a 60 C. oven for 15 hours. Molecular weights were determined by gel permeation chromatography using a polyester calibration.

TABLE 12.1

| | Preparation of additional thickening agents | | | |
|---|---|---|---|---|
| Example | Active H Cmpd. | Poly-BD | $M_w$ | $M_n$ |
| 12 | $(CH_3)_2N(CH_2)_3NH_2$ | R45M | 97,700 | 13,300 |
| 13 | $(CH_3)_2N(CH_2)_3OH$ | " | 147,000 | 19,900 |
| 14 | $(CH_3)_2N(CH_2)_2OH$ | " | 140,000 | 19,700 |
| 15 | $t-BuNHCH_2OH$ | " | — | — |
| 16 | $(Bu)_2N(CH_2)_3NH_2$ | " | 100,100 | 16,300 |
| 17 | $(CH_3)_2NCH_2CHOHCH_2N(CH_3)_2$ | " | — | — |

EXAMPLES 18–21

Preparation of Additional Thickening Agents

Additional thickening agents, Examples 18–21, were prepared using various active hydrogen compounds with the results presented in Table 18.1

To a mechanically-stirred 4-necked round bottom flask fitted with a Dean-Stark trap, thermometer, and reflux condenser was added 71.5 g. hydroxy-terminated polybutadiene (Arco Chemical Co. Poly-BD R-45HT resin with 0.85 milliequivalents of OH/g. resin) and 233.3 g. toluene. The Dean-Stark trap was pre-filled with toluene so that solids content would remain constant. The solution was heated to reflux and water was azeotropically removed for 1 hour. The flask was cooled to 60 C. and 28.5 g. Dimer acid diisocyanate (DDI) (an aliphatic diisocyanate based on a long chain, dimerized fatty acid backbone containing about 36 carbon atoms; "ddi 1410" from Henkel Corporation, Resins Division, Minneapolis, Minn. was used) in 23.2 g. toluene and 0.30 g. dibutyltin dilaurate (Thermolite-12 from M & T Chemicals, Inc. was used) were added. The solution was heated to 85 C. for 6 hours. In a 4-ounce glass jar 75 g. of the reaction mixture so prepared and 13.67 milliequivalents of active hydrogen compound (which had been dried over an activated molecular sieve) were heated in a 60 C. oven for 15 hours. Molecular weights were determined by gel permeation chromatography using a polyester calibration.

TABLE 18.1

| | Preparation of additional thickening agents | | | |
|---|---|---|---|---|
| Example | Active H Cmpd. | Poly-BD | $M_w$ | $M_n$ |
| 18 | $(CH_3)_2N(CH_2)_3NH_2$ | R-45HT | 27,600 | 7,070 |
| 19 | $(CH_3)_2N(CH_2)_3OH$ | " | 136,000 | 13,800 |
| 20 | n-BuOH | " | 152,000 | 16,400 |
| 21 | $HN=C-[N(CH_3)_2]_2$ | " | — | — |

COMPARATIVE EXAMPLE 22

Preparation of Reaction Product of Diisocyanate with 3-(N,N-Dimethylamino)-Propylamine (Active Hydrogen Compound)

To a three-necked round bottom flask fitted with magnetic stir bar, thermometer, addition funnel, and nitrogen inlet was added 16.96 g. dimer acid diisocyanate and 25 g. toluene. Under a nitrogen atmosphere and with stirring, a solution of 6.098 g. 3-(N,N-dimethylamino)-propylamine, which had been dried over an activated molecular sieve, in 26.95 g. toluene was added over a period of about 20 minutes through an addition funnel, maintaining the reaction mixture temperature between 35–40 C. After the addition was complete the solution was allowed to stir for 5 hours at room temperature.

EXAMPLE 23

Thickening of Non-Aqueous Dispersion

To 20 g. of a non-aqueous dispersion (58% polymer by weight based on the NAD weight) in NORPAR-12 continuous phase was added an amount of the thickening agent of one of Examples 1–22 such as to give the thickening agent concentration given in Table 23.1. The thickening agent was added as a solution in toluene at 30% by weight based on the weight of the thickener solution with agitation at room temperature. After shaking for 5 minutes, the Brookfield viscosity was measured using a Brookfield viscometer (Model LVT) using a #3 spindle at the rpm listed in Tab.e 23.1.

TABLE 23.1

Thickening of a non-aqueous dispersion.

| Example | Concentration (%) | Viscosity (cps.) 6 rpm. | 60 rpm. |
|---|---|---|---|
| — | 0 | 100 | 100 |
| 1 | 2 | 1700 | 420 |
| 2 | 2 | 1700 | 470 |
| 3 | 2 | 2400 | 570 |
| 4 | 2 | 2000 | 520 |
| 5 | 2 | 1200 | 460 |
| 6 | 2 | gelled | |
| 6 | 0.03 | 1700 | 1160 |
| 7 | 2 | 600 | 310 |
| 8 | 2 | 1400 | 460 |
| 9 | 2 | 1400 | 400 |
| 10 | 2 | 1400 | 400 |
| 11 | 2 | 2000 | 1400 |

EXAMPLE 24

Thickening of a Non-Aqueous Polymer Dispersion

To 20 g. of a non-aqueous dispersion (40% polymer by weight based on the weight of the non-aqueous dispersion) in NORPAR-12 continuous phase was added an amount of the thickening agent of one of Examples 1–22 such as to give the thickening agent concentration given in Table 24.1. The thickening agent was added as a solution in toluene at 1% by weight based on the weight of the thickener solution with agitation at room temperature. After shaking for 5 minutes and then standing overnight, the Brookfield viscosity was measured using a Brookfield viscometer (Model LVT) using a #3 spindle at the rpm listed in Table 24.1.

TABLE 24.1

Thickening of a non-aqueous dispersion.

| Example | Concentration (%) | Viscosity (cps.) 6 rpm. | 60 rpm. |
|---|---|---|---|
| — | 0 | 20 | 15 |
| 12 | 0.032 | 2800 | 555 |
|  | 0.096 | 8400 | 1610 |
| 13 | 0.032 | 20 | 15 |
|  | 0.096 | 7560 | 1180 |
| 14 | 0.032 | 20 | 15 |
|  | 0.096 | 20 | 15 |
| 15 | 0.032 | 20 | 15 |
|  | 0.096 | 60 | 40 |
| 16 | 0.032 | 1420 | 400 |
|  | 0.096 | 6000 | 1900 |
| 17 | 0.032 | 20 | 15 |
|  | 0.096 | 260 | 150 |
| 18 | 0.032 | not soluble in Norpar-12 | |
| 19 | 0.032 | 170 | 90 |
|  | 0.096 | 9300 | 1480 |
| 20 | 0.032 | 20 | 10 |
| 21 | 0.032 | 190 | 110 |
|  | 0.096 | 8700 | 1200 |
| 22 (COMPARATIVE) | 0.032 | 20 | 10 |
| Bentone Clay (BENTONE SD-1; NL Chemicals) | 0.032 | 20 | 10 |
| Silica (CABOSIL N-70TS; Cabot Corp.) | 0.032 | 20 | 10 |

All the thickening agents of this invention are effective in thickening a non-aqueous dispersion. Samples 14 and 20 were not very effective at the concentrations used; higher concentrations were not employed.

EXAMPLE 25

Effect of Added Solvent/Coalescent on Thickening Efficiency

To 31.85 g. of a nonaqueous dispersion (40% polymer by weight based on the total weight of the dispersion) in NORPAR 12 was added 0.8 g. of a 1.29% solution by weight in toluene of the thickening agent of Example 12, and 0.65 g. (5% by wt. based on polymer solids) or 1.29 g. (10% by wt. based on polymer solids) of solvent. After stirring for 5 minutes, the viscosity was measured using a Brookfield viscometer (Model LVT) using a #3 spindle at the rpm listed in Table 25.1.

TABLE 25.1

Effect of added solvent/coalescent on thickening efficiency.

| Solvent | Concentration (%) | Viscosity (cps.) 6 rpm. | 60 rpm. |
|---|---|---|---|
| none | 0 | 3000 | 510 |
| Diisopropyl adipate | 5 | 4100 | 680 |
|  | 10 | 3600 | 690 |
| Butyl CARBITOL | 5 | 140 | 100 |
|  | 10 | 80 | 60 |
| Xylene | 5 | 3540 | 600 |
|  | 10 | 3400 | 600 |
| i-Propanol | 5 | 140 | 80 |
|  | 10 | — | 15 |
| Methyl amyl ketone | 5 | 1600 | 340 |
|  | 10 | 340 | 245 |
| TEXANOL | 5 | 2080 | 540 |
|  | 10 | 200 | 180 |

Some solvents, particularly Hydrogen-bonding solvents such as butyl CARBITOL, i-propanol, and TEXANOL are effective in reducing the thickening effect of the thickening agents of this invention.

EXAMPLE 26

Thickening of Various Non-Aqueous Solvent-Borne Polymers

To a non-aqueous solvent-borne polymer was added 3.0 g. of the thickening agent as listed in Table 26.1, as a 30% by weight solution in toluene, and the solvent as listed in Table 26.1 with agitation at room temperature. The amount of non-aqueous solvent-borne polymer and solvent was adjusted so that the total sample weight was 20 g. and the concentration of solvent-borne polymer and thickener totalled to 45% solids by weight. The samples were then tumbled overnight and the Brookfield viscosity was measured using a Brookfield viscometer (Model LVT) using a #3 spindle at 6 rpm.

TABLE 26.1

Thickening of various non-aqueous solvent-borne polymers

| Polymer | Solvent | Viscosity (cps.) with THICKENING AGENT | | | |
|---|---|---|---|---|---|
|  |  | none | Ex. 3 | Ex. 6 | Ex. 11 |
| Alkyd polymer AROPLAZ 6440 | Butyl acetate | 40 | 120 | 130 | 80 |
| Alkyd Polymer Cargill 5070 | Naphthol spirits | 60 | 130 | 660 | 170 |
| Acrylic Pol. 1 | Xylene/PrOAc | 1250 | 2120 | 5050 | 1780 |
| Acrylic Pol. 2 | Xylene/PrOAc | 7950 | 11860 | 17300 | 12340 |

The thickening agents of this invention are effective in thickening non-aqueous solvent-borne polymers.

EXAMPLE 27

Thickening of a Non-Aqueous Solvent-Borne Alkyd Polymer with Various Thickening Agents To 20 g. of a non-aqueous solvent-borne long oil length alkyd polymer (Cargill 5070; 70% polymer by weight based on the solution weight) in mineral spirits was added 4.67 g. of the thickening agent of Examples as given in Table 27.1, as a 30% solution by weight in toluene, and 6.13 g. naphthol spirits with agitation at room temperature. After tumbling overnight, the Brookfield viscosity was measured using a Brookfield viscometer (Model LVT) using a #3 spindle at 6 or 60 rpm.

TABLE 27.1

Thickening of a non-aqueous solvent-borne alkyd polymer with various thickening agents

| Thickening Agent Example | Viscosity (cps) | |
|---|---|---|
| | 6 rpm | 60 rpm |
| none | 200 | 205 |
| 12 | 1140 | 1120 |
| 13 | 720 | 730 |
| 14 | 680 | 675 |
| 15 | 540 | 550 |
| 16 | 740 | 760 |
| 17 | 1260 | 1140 |
| 18 | 2420 | 2000 |
| 19 | 1760 | 1540 |
| 20 | 300 | 295 |
| 21 | 1380 | 1250 |
| Comparative 22 | 680 | 680 |

The thickening agents of this invention are effective in thickening non-aqueous solvent-borne polymers.

EXAMPLE 28

Thickening a Non-aqueous Dispersion of Pigment

A non-aqueous Titanium dioxide dispersion was prepared as follows:

| | |
|---|---|
| Pigment dispersant[1] (35% solids in toluene) | 5.14 g. |
| Naphthol Spirits | 15.12 g. |
| Titanium dioxide (DuPont TI-PURE R-900) | 60.0 g. |

[1]The pigment dispersant used was 50 p-12-hydroxystearic acid//GMA//49MMA/1 MAA as described in "Dispersion Polymerization in Organic Media", by K. E. J. Barrett, John Wiley & Sons, Pages 108–109 (1974), The ingredients listed above were combined and ground using a Cowles blade at 3000 rpm. for 15 minutes.

To the above "grind" was added 39.74 g. naphthol spirits and 1 g. of a thickening agent solution (as a 30 weight % solution in toluene). Viscosity was measured using a Brookfield viscometer (Model LVT) using a #3 spindle at 6 or 60 rpm. The results are presented in Table 28.1.

TABLE 28.1

Thickening of a non-aqueous dispersion of pigment

| Thickening Agent | Viscosity (cps.) | |
|---|---|---|
| | 6 rpm | 60 rpm |
| Example 6 | 1700 | 530 |
| None | 20 | 20 |

The thickening agent of Example 6 of this invention was effective in thickening a non-aqueous dispersion of pigment.

EXAMPLE 29

Thickening a Non-aqueous Paint

A non-aqueous paint which utilized a non-aqueous dispersion of polymer as binder vehicle was prepared as follows:

| | |
|---|---|
| Pigment dispersant[1] (35% solids in toluene) | 51.43 g. |
| Naphthol Spirits | 151.16 g. |
| Titanium dioxide (DuPont TI-PURE R-900) | 600.0 g. |

[1]The pigment dispersant used was 50 p-12-hydroxystearic acid//GMA//49MMA/1 MAA as described in "Dispersion Polymerization in Organic Media", by K. E. J. Barrett, John Wiley & Sons, Pages 108–109 (1974), The ingredients listed above were combined and ground using a Cowles blade at 3000 rpm. for 15 minutes.

To 100 g. of the above "grind" were added the following ingredients, in order, with stirring.

| | |
|---|---|
| Non-aqueous dispersion (65% solids in NORPAR 12) | 172.38 g. |
| Diisopropyl adipate | 12.6 g. |
| Dibasic ester (DuPont DBE) | 12.6 g. |
| Dioctyl phthalate | 8.4 g. |
| Thickening agent (30% solution in toluene) | 0.28 g. |
| Naphthol spirits | 17.74 g. |

Viscosity was measured using a Brookfield viscometer (Model LVT) using a #3 spindle at 6, 30, or 60 rpm. after equilibration for three days at room temperature. The results are presented in Table 29.1.

TABLE 28.1

Thickening of a non-aqueous paint

| Thickening Agent | Viscosity (cps.) | | |
|---|---|---|---|
| | 6 rpm | 30 rpm | 60 rpm |
| Example 6 | 10,600 | 3920 | >2000 |
| None | 100 | — | 90 |

The thickening agent of Example 6 of this invention was effective in thickening a non-aqueous paint.

What is claimed is:

1. A thickening agent useful for thickening non-aqueous compositions, made by the process comprising forming a reaction product from a mixture consisting essentially of a polyol, said polyol containing at least two hydroxy groups; a polyisocyanate, said polyisocyanate containing at least two isocyanato groups; and an active hydrogen compound having the formula R—X, wherein X is selected from the group consisting of primary amino, secondary amino, and hydroxyl, and wherein R represents a group consisting essentially of from 1 to about 30 carbon atoms; and wherein the ratio of the number of said isocyanato groups to the number of said hydroxy groups in said polyol is from about 1.05 to about 2.1; and wherein the ratio of the sum of the number of active hydrogen groups and said number of said hydroxy groups in said polyol to the said number of said isocyanato groups is less than about 1.5.

2. A thickening agent useful for thickening non-aqueous compositions, made by the process comprising:
   (a) forming a reaction product from a mixture consisting essentially of a polyol, said polyol containing at least two hydroxy groups, and a polyisocyanate, said polyisocyanate containing at least two isocyanato groups, wherein the ratio of the number of said isocyanato groups to the number of said hydroxy groups in said polyol is from about 1.05 to about 2.1; and, (b) contacting said reaction product with an active hydrogen compound having the formula R—X, wherein X is selected from the group consisting of primary amino, secondary amino, and hydroxyl, and wherein R represents a group consisting essentially of from 1 to about 30 carbon atoms.

3. The thickening agent of claim 1 or claim 2 wherein said polyol is a dihydroxypolybutadiene.

4. The thickening agent of claim 3 wherein said dihydroxypolybutadiene is an $\alpha,\omega$-dihydroxypolybutadiene.

5. The thickening agent of claim 1 or claim 2 wherein said polyisocyanate is a diisocyanate.

6. The thickening agent of claim 5 wherein said diisocyanate is dimer acid diisocyanate.

7. The thickening agent of claim 1 or claim 2 wherein said ratio of the number of said isocyanato groups to the number of said hydroxy groups is from about 1.1 to about 1.8.

8. The thickening agent of claim 1 or claim 2 wherein said active hydrogen compound is a compound selected from the group consisting of tertiary-aminoalkyl alcohols and tertiary-aminoalkyl amines, said compound containing from 1 to about 30 carbon atoms.

9. A process for making a thickening agent, useful for thickening non-aqueous solvent-containing compositions, comprising forming a reaction product from a mixture consisting essentially of a polyol, said polyol containing at least two hydroxy groups; a polyisocyanate, said polyisocyanate containing at least two isocyanato groups; and an active hydrogen compound having the formula R—X, wherein X is selected from the group consisting of primary amino, secondary amino, and hydroxyl, and wherein R represents a group consisting essentially of from 1 to about 30 carbon atoms; and wherein the ratio of the number of said isocyanato groups to the number of said hydroxy groups in said polyol is from about 1.05 to about 2.1; and wherein the ratio of the sum of the number of active hydrogen groups and said number of said hydroxy groups in said polyol to the said number of said isocyanato groups is less than about 1.5.

10. A process for making a thickening agent, useful for thickening non-aqueous solvent-containing compositions, comprising:

(a) forming a reaction product from a mixture consisting essentially of a polyol, said polyol containing at least two hydroxy groups, and a polyisocyanate, said polyisocyanate containing at least two isocyanato groups, wherein the ratio of the number of said isocyanato groups to the number of said hydroxy groups is from about 1.05 to about 2.1; and, (b) contacting said reaction product with an active hydrogen compound having the formula R—X, wherein X is selected from the group consisting of primary amino, secondary amino, and hydroxyl, and wherein R represents a group consisting essentially of from 1 to about 30 carbon atoms.

11. A thickened non-aqueous composition comprising the thickening agent composition of claim 1 or claim 2.

12. A method for thickening a non-aqueous composition consisting essentially of admixing said nonaqueous composition with the thickening agent composition of claim 1 or claim 2.

* * * * *